2,998,348
PROCESS FOR CONTROLLING INSECTS

Robert Seydel, Köln-Dellbruck, Günter Unterstenhöfer, Opladen, and Rudolf Stroh, Leverkusen, Germany, assignors to Farbenfabriken Bayer Aktiengesellschaft, Leverkusen, Germany, a corporation of Germany
No Drawing. Filed July 7, 1959, Ser. No. 825,420
Claims priority, application Germany July 26, 1958
2 Claims. (Cl. 167—31)

The present invention relates to and has as its objects new and useful insecticidal compounds, and a new and economical process for their production. The new compounds of the present invention are 2.6-di-tertiary-alkylated 4-nitrophenols of the following formula

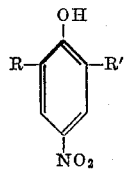

in which R and R' stand for tertiary alkyl groups, such as the tertiary butyl-, tertiary amyl-, tertiary hexyl-group, and the like.

Among the agents for combating plant-damaging mites, some dinitrophenols have gained a certain practical importance. Such compounds are for example 4.6-dinitro-2-cyclohexylphenol, 4.6-dinitro-2-secondary-amylphenol and 4.6-dinitro-2-caprylphenol crotonate and the like.

Compared with organic phosphorus compounds and the acaricides related to DDT they are, however, of minor practical importance, plant tolerance being not quite satisfactory.

The ever increasing resistance developed by spider mites to commercial acaricides has made it necessary to search for new active substances which are fully effective against these new species of mites. The demand for acaricides in controlling resistant mites in fruit and cotton growng is especially important.

It has now been found that 2.6-di-tertiary-alkylated 4-nitrophenols possess a marked activity against normally sensitive and resistant species of spider mites together with a sufficient plant tolerance in fruit and cotton growing. Moreover, the new agents have proved to be highly effective against tarsonemides some of which are significant pests in African cotton culture (*Hemitarsonemus latus*) and against Eriophydes and insect ovae (ovicides).

It has further been found that the hitherto unobtainable 2.6-di-tertiary-alkylated 4-nitrophenols are surprisingly obtained by causing dilute aqueous nitric acid to act on solutions of di-tertiary-alkyl-phenols in water-insoluble organic solvents. As such organic solvents, low boiling aliphatic hydrocarbons such as benzene or ligroine have proved particularly useful. The hitherto not described 2.6-di-tertiary-alkyl-4-nitrophenols are obtained by the method according to the invention in excellent yields and in a very pure state. The process of the invention is chiefly distinguished in that it can be carried out in a convenient manner on a technical scale.

It is already known to nitrate 2.6-dialkylated phenols in concentrated sulfuric acid with nitric acid, the corresponding 4-nitro-substituted compounds thus being obtained. If, however, attempts are made to nitrate 2.6-ditertiary-alkylated phenols in this manner, there are not obtained the corresponding 4-nitro compounds as is known from literature but instead the 2-tertiary-alkyl-4.6-dinitrophenols. A tertiary alkyl group is thus eliminated and replaced by a nitro group. The same 2-tertiary-alkyl-4.6-dinitrophenols can be obtained, as is known from the literature, from the corresponding 2-tertiary-alkyl-phenols by nitration with nitric acid.

The following example is given for the purpose of illustrating how the inventive compounds may be obtained:

EXAMPLE 1

In a vessel provided with stirrer and acidproof lining, 1648 parts by weight of 2.6-di-tertiary-butyl-phenol are dissolved in 1700 parts by volume of gasoline (boiling range 60–95° C.), and 1940 parts by volume of 30% nitric acid (density at 20° C.: 1.185) are run into this solution at 50 to 60° C. within 3 hours with initial cooling; while slowly cooling to 20° C. the mixture is stirred for a further 18 hours and the crystalline reaction product centrifuged off, washed with water and dried in a drying oven at 80 to 90° C. 1618 parts by weight of 4-nitro-2.6-di-tertiary-butyl-phenol of M.P. 157° C. are thus obtained. The yield is 80.5% of the theoretical.

By the same way but using instead of 2.6-di-tertiary-butyl-phenol the corresponding molecular amount of 2.6-di-tertiary-amyl-phenol, the 4-nitro-2.6-di-tertiary-amyl-phenol is obtained in about the same amount.

The following examples are given for the purpose of illustrating the utility of the inventive compounds:

EXAMPLE 2

*Activity against tetranychus*

(a) Bean plants strongly infested by spider mites were sprayed with aqueous emulsions of 4-nitro-2.6-ditertiary-butylphenol at various concentrations formulated as follows:

50% of active substance
2% of commercial aromatic polyglycol ether (emulsifier)
3% of magnesium stearate
Remainder: chalk

TETRANYCHUS TELARIUS, RESISTANT FORM

| active substance (pure active subst. in aqueous emulsion) Percent | Percent mortality | | degree of infestation, 8 d. |
|---|---|---|---|
| | 24 h. | 3 d. | |
| 0.05 | 100 | 100 | 0 |
| 0.025 | 100 | 100 | 0–1 |
| 0.01 | 80 | 100 | 1–2 |
| 0.005 | 40 | 50 | 2–3 |

(b) In a similar manner, plants infested by resistant spider mites and plants infested by normally sensitive mites were sprayed.

TETRANYCHUS TELARIUS

| active substance, percent | normally sensitive degree of infestation, percent | | resistant degree of infestation, percent | |
|---|---|---|---|---|
| | 48 h. | 8 d. | 48 h. | 8 d. |
| 0.03 | 100 | 1 | 100 | 0–1 |
| control | 10 | 4 | 2 | 5 |

(c) Tests on the fruit tree spider mite (*Paratetranychus pilosus*): Potted small apple trees infested by normally sensitive fruit tree spider mites were treated with various concentrations of the active substance formulated according to Example 2 and the mortality was ascertained after 14 days.

PARATETRANYCHUS PILOSUS, NORMALLY SENSITIVE

| active substance, percent | mortality of postembryonic stages after 14 days, percent |
|---|---|
| 0.05 | 100 |
| 0.025 | 98 |
| 0.01 | 86 |
| 0.005 | 59 |

(d) Field test on fruit tree spider mites: Apple trees strongly infested by fruit tree spider mites were sprayed with the active substance formulated according to Example 2 and the mortality was ascertained after 5 days.

PARATETRANYCHUS PILOSUS, FIELD TEST

| active substance, percent | mortality after 5 days, percent |
|---|---|
| 0.05 | 96 |

EXAMPLE 3

*Activity against tarsonemides*

(a) Tests with *Hemitarsonemus latus* on cotton: Cotton plants infested by *Hemitarsonemus latus* were sprayed with the preparation formulated as described above. The mortality was ascertained after 4 days.

HEMITARSONEMUS LATUS

| conc. 4-nitro-2.6-ditertiary-butylphenol, percent | mortality after 4 days, percent | kelthane, percent |
|---|---|---|
| 0.1 | 100 | 100 |
| 0.01 | 100 | 100 |
| 0.001 | 100 | 95 |
| 0.0003 | 70 | 100 |
| 0.0001 | 50 | 10 |
| 0.00003 | 15 | 10 |

(b) Test on *Hemitarsonemus latus*: Cotton plants strongly infested by *Hemitarsonemus latus* were sprayed with a 2.5% formulation prepared as described above, but applied as dust with the use of talc as an extender. The quantities used were 30 kg./ha. and 15 kg./ha. respectively.

| 2.5 percent dust | Mortality after 48 hours, percent | |
|---|---|---|
| | 30 kg./ha. (50 mg.) | 15 kg./ha. (15 mg.) |
| 4-nitro-2.6-ditertiary-butylphenol | 100 | 95 |
| parathione | 30 | 0 |

EXAMPLE 4

*Activity against Eriophydes*

(a) Tests on *Eriophyes ribis*: Tests on leaflets from divided gall infested by *Eriophyes ribis* were so carried out that the leaves with the mites were dipped in various concentrations of the preparation formulated according to Example 2.

| *Eriophyes ribis* active substance 4-nitro-2.6-ditertiary-butylphenol, percent | Dipping infested leaflets from divided galls | |
|---|---|---|
| | mortality, percent | kelthane, percent |
| 0.1 | 100 | 96 |
| 0.01 | 100 | 0 |
| 0.001 | 100 | 0 |
| 0.0003 | 60 | 0 |
| 0.0001 | 20 | 0 |
| 0.00003 | 10 | 0 |

EXAMPLE 5

Plant tolerance. The plant tolerance of 4-nitro-2.6-ditertiary-butylphenol was tested in field tests in German and Italian fruit growing that is to say under different oecological conditions by spraying important apple varieties during pre-blossom and after-blossom. The plant tolerance was evaluated according to the known scale values 0–5, 0 meaning no damage and 5 meaning complete damage.

The preparation did not show damages to cotton.

PLANT TOLERANCE IN FRUIT GROWING

GERMANY (BERGISCHES LAND)

| apple variety | (a) pre-blossom | (b) after-blossom |
|---|---|---|
| | with 0.05% active substance | |
| Jonathan | 0 | 0 |
| Wealthy | 0 | 0 |
| Berlepsch | 0 | 0 |
| Cox | 1–0 | 0 |
| Golden Delicious | 0 | 0 |
| Boskoop | 0 | 0 |
| Goldparmane | 0 | 0 |
| Champagner | 0 | 0 |
| James Grieve | 0 | 0 |

ITALY (SOUTH TYROL)

| apple variety | (c) pre- and after-blossom with 0.05% active substance |
|---|---|
| Champagner | 0 |
| Gravensteiner | 0 |
| Kalter | 0 |
| Morgenduft | 0 |

We claim:

1. A process for controlling insects which comprises contacting them with an effective amount of a 2,6-ditertiary-alkylated-4-nitrophenol.

2. The process of claim 1 wherein the 2,6-ditertiary-alkylated-4-nitrophenol is 2,6-ditertiary-butyl-4-nitrophenol.

References Cited in the file of this patent

UNITED STATES PATENTS 2,868,844     Coffield et al.           Jan. 13, 1959